Figure 1:
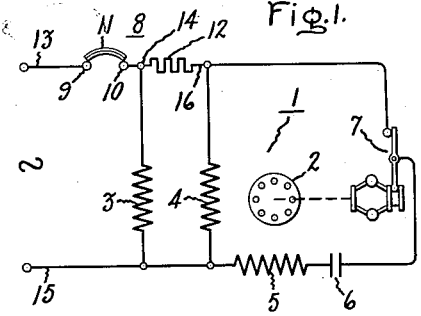

March 3, 1953  R. E. SEELY  2,630,553
DUAL VOLTAGE ALTERNATING CURRENT MOTOR
Filed May 15, 1951

Inventor:
Richard E. Seely,
by Ernest H. Britton
His Attorney.

Patented Mar. 3, 1953

2,630,553

UNITED STATES PATENT OFFICE 2,630,553

DUAL VOLTAGE ALTERNATING CURRENT MOTOR

Richard E. Seely, Fort Wayne, Ind., assignor to General Electric Company, a corporation of New York Application May 15, 1951, Serial No. 226,470

10 Claims. (Cl. 318—225)

This invention relates to alternating current motors and more particularly to dual voltage motors having thermal overload protection.

In the design of single-phase alternating current motors, particularly fractional horsepower motors of the induction type, it is frequently desirable to provide for operation on either of two voltages. It is furthermore frequently desirable to provide thermal overload protection for operation on either of the two voltages and to provide for conveniently changing the connections of the motor from one voltage to the other. It is preferable that all of the connections necessary to change the motor from one voltage to the other be made on a terminal board mounted on the motor, thus eliminating complicated external switching devices, and it is also desirable that the terminal board have a minimum number of studs. It may further be desirable to arrange the circuit so that the current from a part of the running winding and the current from the starting winding traverse the heating element of the overload protective device in order to provide shorter locked rotor trip times on the low voltage connection.

It is accordingly an object of this invention to provide an improved dual voltage, self-starting, single-phase alternating current motor having the features enumerated above as being desirable.

Further objects and advantages of this invention will become apparent and the invention will be better understood by reference to the following description and the accompanying drawing, and the features of novelty which characterize this invention will be pointed out with particularity in the claims annexed to and forming a part of the specification.

In accordance with this invention, an alternating current motor is provided having two running winding sections, a starting winding, and a thermal overload switch having a heat-sensitive element and a heating coil. The contact of the thermal switch, which are normally bridged by the heat-sensitive element, and the heating coil are permanently connected in series circuit relation with one side of a source of alternating current. In the low voltage connection, one of the running winding sections is connected across the end of the heating coil adjacent the contacts and the other side of a source of alternating current and the other running winding section is connected across the end of the heating coil remote from the contacts and the other side of the source of alternating current with the starting winding being connected in parallel with the last-mentioned running winding section. Thus, the current in the last-mentioned running winding section and the starting winding will traverse the heating coil while all the current will traverse the heat-sensitive element. In the high voltage connection, the thermal switch contacts, the heating coil, and both running winding sections are serially connected across the source of alternating current and the starting winding is connected in parallel across one of the running winding sections. Thus, all of the current traverses the heating coil and the heat-sensitive element and the connections to change from the low voltage to the high voltage circuit are made on either a 4-stud or a 3-stud terminal board.

Figure 3:
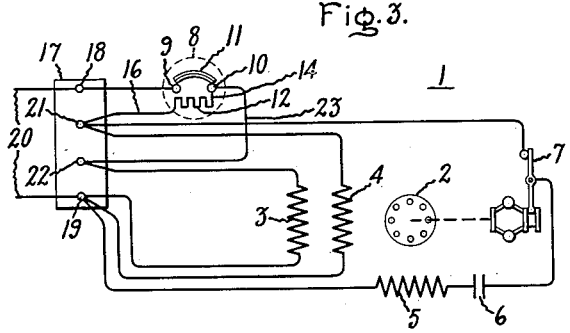
Figure 2:
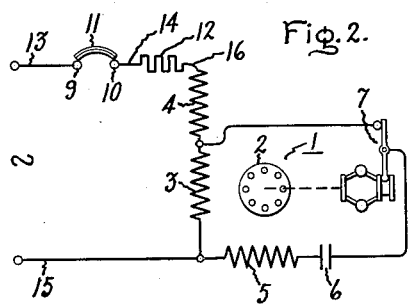
Figure 4:
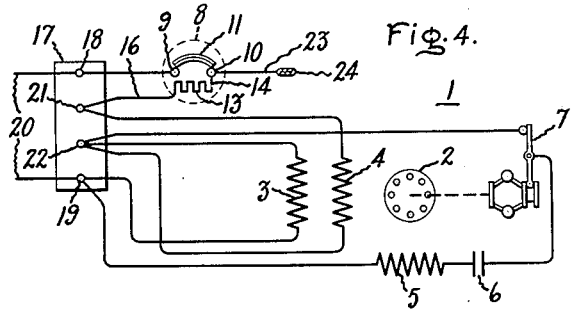
Figure 5:
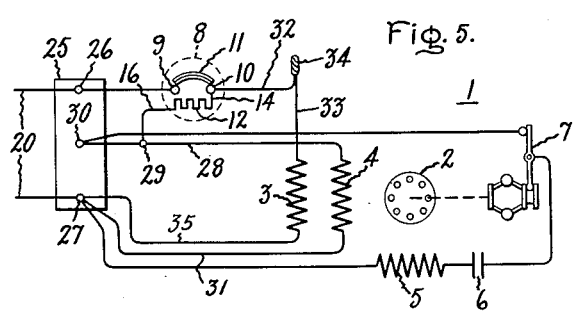
Figure 6:
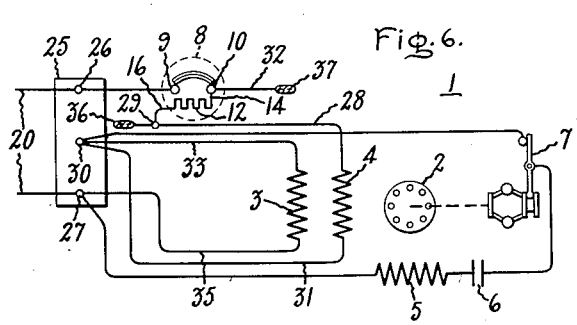

In the drawing, Fig. 1 is a schematic illustration showing the low voltage connection of the improved dual voltage motor of this invention; Fig. 2 is a schematic illustration showing the high voltage connection; Fig. 3 is a schematic illustration showing the improved dual voltage motor of this invention utilizing a 4-stud terminal board connected for the low voltage operation; Fig. 4 is a schematic illustration showing the high voltage connection made on the 4-stud terminal board; Fig. 5 is a schematic illustration showing the improved dual voltage motor of this invention utilizing a 3-stud terminal board with the low voltage connection made thereto; and Fig. 6 illustrates the high voltage connection made to the 3-stud terminal board.

Referring now to Fig. 1, there is shown a single-phase alternating current motor 1 having a rotor 2, shown here as being of the squirrel cage type, two running winding sections 3 and 4, and a starting winding 5. In order to provide a self-starting for the motor 1 on a single-phase source of alternating current, it will be readily understood that the running windings 3 and 4 are physically displaced from the starting winding 5 in the stator of the motor (not shown) and an additional phase displacement may be secured by the use of a capacitor 6 arranged in series with the starting winding 5. A speed-responsive switch 7, shown here as being of the centrifugal type, is arranged in series with the starting winding 5 and the capacitor 6 and serves to disconnect the starting winding circuit when the motor has reached a predetermined speed.

In order to provide thermal overload protection for the motor 1, a thermal overload protective device or switch 8 is provided having a pair of contacts 9 and 10 normally bridged by a heat-sensitive element 11. The heat-sensitive element 11, which may be a bimetallic disk, is adapted to open the contacts 9 and 10 responsive to a predetermined temperature. The thermal switch 8 is also provided with a heating coil 12 arranged in heat transfer relationship with the heat-sensitive element 11. The contact 9 of the switch 8 is connected to one side 13 of an external source of alternating current (not shown) and the contact 10 is connected to one end 14 of the heating coil 12. In the low voltage connection shown in Fig. 1, the running winding section 3 is connected across the end 14 of the heating coil 12 and the other side 15 of the source of alternating current. The other running winding section 4 is connected across the end 16 of the heating coil 12 remote from the contacts 9 and 10 and the other side 15 of the source of alternating current. The starting winding circuit comprising the starting winding 5, capacitor 6 and speed-responsive switch 7 is connected in parallel across the running winding section 4. It will now be readily apparent that during this connection, the current in the running winding section 4 and the current in the starting winding 5 traverse the heating coil 12 and that all of the current will traverse the heat-sensitive element 11. This feature provides shorter locked rotor trip time on the low voltage connection, since the starting winding current is flowing in the heating coil. While the motor of Fig. 1 is shown as being of the capacitor type, it will be readily understood that the invention is equally applicable to a split phase motor in which the capacitor is eliminated, or in a permanent capacitor split motor.

Referring now to Fig. 2 in which like elements are indicated by like reference numerals, there is shown the high voltage connection. Here the contacts 9 and 10 of the switch 8, the heating coil 12, and the running winding sections 3 and 4 are serially connected across the sides 13 and 15 of the source of alternating current. The starting winding circuit, including the starting winding 5, the capacitor 6 and the speed-responsive switch 7 is connected across one of the running winding sections shown here as being running winding section 3. It will be readily apparent that in the high voltage connection, as shown in Fig. 2, all of the current traverses the heating coil 12 and the heat-sensitive element 11.

Referring now to Fig. 3, there is shown an arrangement utilizing a 4-stud terminal board 17 with the source of alternating current being connected to terminals 18 and 19 by lines 20. The contact 9 of the thermal switch 8 is directly connected to the terminal 18 with the end 14 of the heating coil 12 being connected to contact 10 and the end 16 being connected to the terminal 21. Thus, the contacts 9 and 10 and the heating coil 12 of the thermal switch 8 are serially connected across the terminals 18 and 21. In the low voltage connection shown in Fig. 3, the running winding section 3 is connected across terminals 19 and 22 and the running winding section 4 is connected across terminals 19 and 21. The starting winding circuit including the starting winding 5, capacitor 6 and speed-responsive switch 7 is connected in parallel with the running winding section 4 across terminals 19 and 21. A lead 23 connects the contact 10 of the switch 8 and terminal 22. Examination of this arrangement will readily disclose that the circuit is that shown in Fig. 1.

Referring now to Fig. 4, which shows the high voltage connection, it will be seen that the contacts 9 and 10 of the switch 8 and the heating coil 12 are still serially connected across the terminals 18 and 21. In order to convert the low voltage circuit of Fig. 3 to the high voltage circuit of Fig. 4, the lead 23 connected to the contact 10 of the switch 8 is disconnected from the terminal 22 and left free with its end preferably taped, as shown at 24. The running winding section 3 is left connected across the terminals 19 and 22. However, the running winding section 4 is connected across terminals 21 and 22 and the starting winding circuit is connected across terminals 19 and 22. Inspection of this circuit will readily reveal that it is the high voltage circuit shown in Fig. 2.

In order to secure operation of the motor 1 in the opposite direction of rotation for either the low voltage connection of Fig. 3 or the high voltage connection of Fig. 4, it is merely necessary to reverse the connection of the starting winding circuit to the terminals 19 and 21 in the case of Fig. 3 or to the terminals 19 and 22 in the case of Fig. 4.

Referring now to Fig. 5 there is shown a low voltage connection utilizing a 3-stud terminal board 25 with the source of alternating current being connected to terminals 26 and 27 by lines 20. Here the contact 9 of switch 8 is connected to terminal 26 and the end 14 of the heating coil 12 is connected to contact 10. The end 16 of the heating coil 12 is connected to lead 28 of running winding section 4, as at 29, and thus, the contacts 9 and 10 and the heating coil 12 are serially connected with the terminal 26 and the running winding section 4. In the low voltage connection shown in Fig. 5, the lead 28 of the running winding section 4 is connected to terminal 30 of terminal board 25 and the other lead 31 of running winding section 4 is connected to terminal 27. The starting winding circuit including the starting winding 5, capacitor 6 and speed-responsive switch 7 are connected in parallel with the running winding section 4 across the terminals 27 and 30. A lead 32 is connected to contact 10 of switch 8 and is joined to lead 33 of running winding section 3, as at 34, this joint being preferably taped. The other lead 35 of the running winding section 3 is connected to terminal 27 of terminal board 25. Inspection of this circuit will readily reveal that it is the low voltage connection shown schematically in Fig. 1.

The high voltage connection of the 3-stud terminal board arrangement of Fig. 5 is shown in Fig. 6 and it will be noted that contacts 9 and 10 and heating coil 12 are still serially connected with terminal 26 and running winding 4 through connection 29 and lead 28. In order to reconnect the circuit for high voltage operation, lead 28 of running winding section 4 is disconnected from terminal 30 and is preferably taped, as at 36. The connection 34 between lead 32 connected to contact 10 and lead 33 of running winding section 3 is broken with lead 33 of running winding section 3 being connected to terminal 30 and the open end of lead 32 being preferably taped, as at 37. The other lead 35 of running winding section 3 remains connected to terminal 27 and lead 31 of running winding section 4 is connected to terminal 30. The starting winding circuit including starting winding 5, capacitor 6 and speed-responsive switch 7 remain connected across terminals 27 and 30. It will be readily apparent that operation of the motor in the opposite direction of rotation may be secured in either the circuits of Fig. 5 or 6 by reversing the connections of the starting winding circuit on terminals 27 and 30. Inspection of Fig. 6 will readily reveal that it is the circuit shown schematically in Fig. 2.

It will now be readily apparent that this invention provides an improved dual-voltage, self-starting, single-phase alternating current motor circuit wherein the current from one running winding section and the starting winding traverse the heating coil of the thermal switch during the low voltage connection in order to provide shorter locked rotor trip times and all of the connections necessary to change from the low voltage to the high voltage arrangement and vice versa and to change from one direction of rotation to the other are made on either a 3-stud or a 4-stud terminal board.

While I have shown and described particular embodiments of this invention, further modifications and improvements will occur to those skilled in the art. I desire it to be understood, therefore, that this invention is not limited to the forms shown and I intend in the appended claims to cover all modifications which do not depart from the spirit and scope of this invention.

What I claim as new and desire to secure by Letters Patent of the United States is:

1. A dual-voltage, self-starting, single-phase alternating current motor comprising a starting winding circuit, two running winding sections, a thermal switch having a heat-sensitive element normally bridging a pair of contacts and adapted to open the same responsive to a predetermined temperature and a heating coil arranged to effect said heat-sensitive element, a four-stud terminal board having its first and second terminals adapted to be connected to a source of single-phase alternating current, said contacts and said heating coil being serially connected across the first and third of said terminals, and means including said terminal board for at times operating said motor from a low-voltage source of single-phase alternating current with the end of said heating coil adjacent said contacts being connected to the fourth of said terminals and with one of said running winding sections being connected across the second and fourth of said terminals and the other of said running winding sections and said starting winding circuit being connected across the second and third of said terminals whereby the currents in said starting winding circuit and the other of said running winding sections traverse said heating coil and all of the current traverses said heat-sensitive element, and for at other times operating said motor from a high-voltage source of single-phase alternating current with one of said running winding sections being connected across the third and fourth of said terminals and with the other of said running winding sections and said starting winding circuit being connected across the second and fourth of said terminals whereby all of the current traverses said heating coil and said heat-sensitive element.

2. A dual-voltage, self-starting, single-phase alternating current motor comprising a starting winding circuit, two running winding sections, a thermal switch having a heat-sensitive element normally bridging a pair of contacts and adapted to open the same responsive to a predetermined temperature and a heating coil arranged to effect said heat-sensitive element, a three-stud terminal board having its first and second terminals adapted to be connected to a source of single-phase alternating current, said contacts and said heating coil being connected in series with said first terminal and one of said running winding sections, and means including said terminal board for at times operating said motor from a low-voltage source of single-phase alternating current with said one running winding section and said starting winding circuit being connected across the second and third of said terminals and with the other of said running winding sections being connected to the second of said terminals and to the contact remote from said first terminal whereby the currents in said starting winding circuit and said one running winding section traverse said heating coil and all of the current traverses said heat-sensitive element, and for at other times operating said motor from a high-voltage source of single-phase alternating current with said one running winding section having its end remote from its connection with said heating coil connected to said third terminal and said other running winding section and said starting winding circuit being connected across said second and third terminals whereby all of the current traverses said heating coil and said heat-sensitive element.

3. A dual-voltage, self-starting, single-phase, alternating current motor comprising a starting winding circuit, two running winding sections, a thermal switch having a heat-sensitive element normally bridging a pair of contacts and adapted to open the same responsive to a predetermined temperature and a heating coil arranged to effect said heat-sensitive element, a four-stud terminal board having its first and second terminals adapted to be connected to a source of single-phase alternating current, said contacts and said heating coil being serially connected across the first and third of said terminals, a lead connected to the contact remote from said first terminal, and means including said terminal board for at times operating said motor from a low-voltage source of single-phase alternating current with said lead being connected to the fourth of said terminals and with one of said running winding sections being connected across the second and fourth of said terminals and the other of said running winding sections and said starting winding circuit being connected across the second and third of said terminals whereby the currents in said starting circuit winding and the other of said running winding sections traverse said heating coil and all of the current traverses said heat-sensitive element, and for at other times operating said motor from a high-voltage source of single-phase alternating current with said lead being disconnected from said fourth terminal and with one of said running winding sections being connected across the third and fourth of said terminals and the other of said running winding sections and said starting winding circuit being connected across the second and fourth of said terminals whereby all of the current traverses said heating coil and said heat-sensitive element.

4. A dual-voltage, self-starting, single-phase, alternating current motor comprising a starting winding circuit, two running winding sections, a thermal switch having a heat-sensitive element normally bridging a pair of contacts and adapted to open the same responsive to a predetermined temperature and a heating coil arranged to effect said heat-sensitive element, a three-stud terminal board having its first and second terminals adapted to be connected to a source of single-phase alternating current, each of said running winding sections having two leads, another lead connected to the contact remote from said first terminal, said contacts and said heating coil being connected in series with said first terminal and one of the leads of one of said running winding sections, and means including said terminal board for at times operating said motor from a low-voltage source of single-phase alternating current with said leads of said one running winding section and said starting winding circuit being respectively connected across the second and third of said terminals and with one lead of the other of said running winding sections being connected to said other lead and the other lead of said other running winding section being connected to said second terminal whereby the currents in said starting winding circuit and said one running winding section traverse said heat-sensitive element, and for at other times operating said motor from a high-voltage source of single-phase alternating current with said one lead of said one running winding section being disconnected from said third terminal and said other lead of said one running winding section connected to said third terminal and with said one lead of said other running winding section being disconnected from said other lead and connected to said third terminal and said other lead of said other running winding section being connected to said second terminal and with said starting winding circuit being connected across said second and third terminals whereby all of the current traverses said heating coil and said heat-sensitive element.

5. A dual-voltage, self-starting, single-phase alternating current motor comprising a starting winding circuit, two running winding sections, a thermal switch having a heat-sensitive element normally bridging a pair of contacts and adapted to open the same responsive to a predetermined temperature and a heating coil arranged to effect said heat-sensitive element, and a four-stud terminal board having its first and second terminals adapted to be connected to a source of alternating current, said contacts and said heating coil being serially connected across the first and third of said terminals, the end of said heating coil adjacent said contacts being connected to the fourth of said terminals, one of said running winding sections being connected across the second and fourth of said terminals and the other of said running winding sections and said starting winding circuit being connected across the second and third of said terminals whereby the currents in said starting winding circuit and the other of said running winding sections traverse said heating coil and all of the current traverses said heat-sensitive element.

6. A dual-voltage, self-starting, single-phase alternating current motor comprising a starting winding circuit, two running winding sections, a thermal switch having a heat-sensitive element normally bridging a pair of contacts and adapted to open the same responsive to a predetermined temperature and a heating coil arranged to effect said heat-sensitive element, and a four-stud terminal board having its first and second terminals adapted to be connected to a source of alternating current, said contacts and said heating coil being serially connected across the first and third of said terminals, one of said running winding sections being connected across the third and fourth of said terminals and the other of said running winding sections and said starting winding circuit being connected across the second and fourth of said terminals whereby all of the current traverses said heating coil and said heat-sensitive element.

7. A dual-voltage, self-starting, single-phase alternating current motor comprising a starting winding circuit, two running winding sections, a thermal switch having a heat-sensitive element normally bridging a pair of contacts and adapted to open the same responsive to a predetermined temperature and a heating coil arranged to effect said heat-sensitive element, and a three-stud terminal board having its first and second terminals adapted to be connected to a source of single-phase alternating current, said contacts and said heating coil being connected in series with said first terminals and one of said running winding sections, said one running winding section and said starting winding circuit being connected across the second and third of said terminals, and the other of said running winding sections being conected to the second of said terminals and to the contact remote from said first terminal whereby the currents in said starting winding circuit and said one running winding section traverse said heating coil and all of the current traverses said heat-sensitive element.

8. A dual-voltage, self-starting, single-phase alternating current motor comprising a starting winding circuit, two running winding sections, a thermal switch having a heat-sensitive element normally bridging a pair of contacts and adapted to open the same responsive to a predetermined temperature and a heating coil arranged to effect said heat-sensitive element, and a three-stud terminal board having its first and second terminals adapted to be connected to a source of single-phase alternating current, said contacts and said heating coil being connected in series with said first terminal and one of said running winding sections, said one running winding section having its ends remote from its connection with said heating coil connected to said third terminal, and said other running winding section and said starting winding circuit being connected across said second and third terminals whereby all of the current traverses said heating coil and said heat-sensitive element.

9. A dual-voltage, self-starting, single-phase alternating current motor comprising a starting winding circuit, two running winding sections, a thermal switch having a heat-sensitive element normally bridging a pair of contacts and adapted to open the same responsive to a predetermined temperature and a heating coil arranged to effect said heat-sensitive element, said contacts being adapted to be serially connected to one side of a source of single-phase alternating current, said heating coil and one end of one of said running winding sections being connected in series circuit relation with said contacts, one end of the other of said running winding sections being adapted to be serially connected to the other side of said source of single-phase alternating current, one end of said starting winding circuit being connected to said one end of said other running winding section, first circuit establishing means having a first connection with the other end of said other running winding section being connected to the end of said heating coil adjacent said contacts and a second connection with said other end of said other running winding section being connected to the other end of said starting winding circuit, second circuit establishing means having a first connection with the other end of said first running winding section being connected to said one end of said other running winding section and a second connection with said other end of said first running winding section being connected to said other end of said starting winding circuit, and third circuit establishing means having a first connection with said other end of said starting winding circuit being connected to said one end of said first running winding section and a second connection with said other end of said starting winding circuit disconnected from said one end of said first running winding section, said circuit establishing means in their first connections providing a low-voltage circuit for said motor and in their second connections providing a high-voltage circuit for said motor.

10. A dual-voltage, self-starting, single-phase alternating current motor comprising a starting winding circuit, two running winding sections, a thermal switch having a heat-sensitive element normally bridging a pair of contacts and adapted to open the same responsive to a predetermined temperature and a heating coil arranged to effect said heat-sensitive element, said contacts being arranged to open one side of a source of single-phase alternating current, first circuit establishing means having a first connection with one of said running winding sections connected across said contacts and the other side of said source of alternating current and a second connection with said starting winding circuit being connected across said one running winding section, second circuit establishing means having a first connection with said heating coil and the other of said running winding sections being serially connected across said contacts and said other side of said source of alternating current and a second connection with said heating coil and both of said running winding sections serially connected across said contacts and said other side of said source of alternating current, and third circuit establishing means having a first connection with said starting winding circuit connected across said other running winding section and a second connection with said starting winding circuit disconnected from said other running winding section, said circuit establishing means in their first connections providing a low-voltage circuit for said motor and in their second connections providing a high-voltage circuit for said motor.

RICHARD E. SEELY.

REFERENCES CITED

The following references are of record in the file of this patent:

UNITED STATES PATENTS

| Number | Name | Date |
| --- | --- | --- |
| 1,979,160 | Kennedy | Oct. 30, 1934 |
| 1,997,673 | Boothby | Apr. 16, 1935 |
| 2,057,525 | Horning | Oct. 13, 1935 |
| 2,208,396 | Scott et al. | July 16, 1940 |
| 2,255,437 | Pearce | Sept. 9, 1941 |
| 2,262,870 | Veinott et al. | Nov. 18, 1941 |